Oct. 24, 1950  J. R. MAY ET AL  2,527,022
FLUID CONTROLLED PROPELLER
Filed Feb. 17, 1945  2 Sheets-Sheet 1
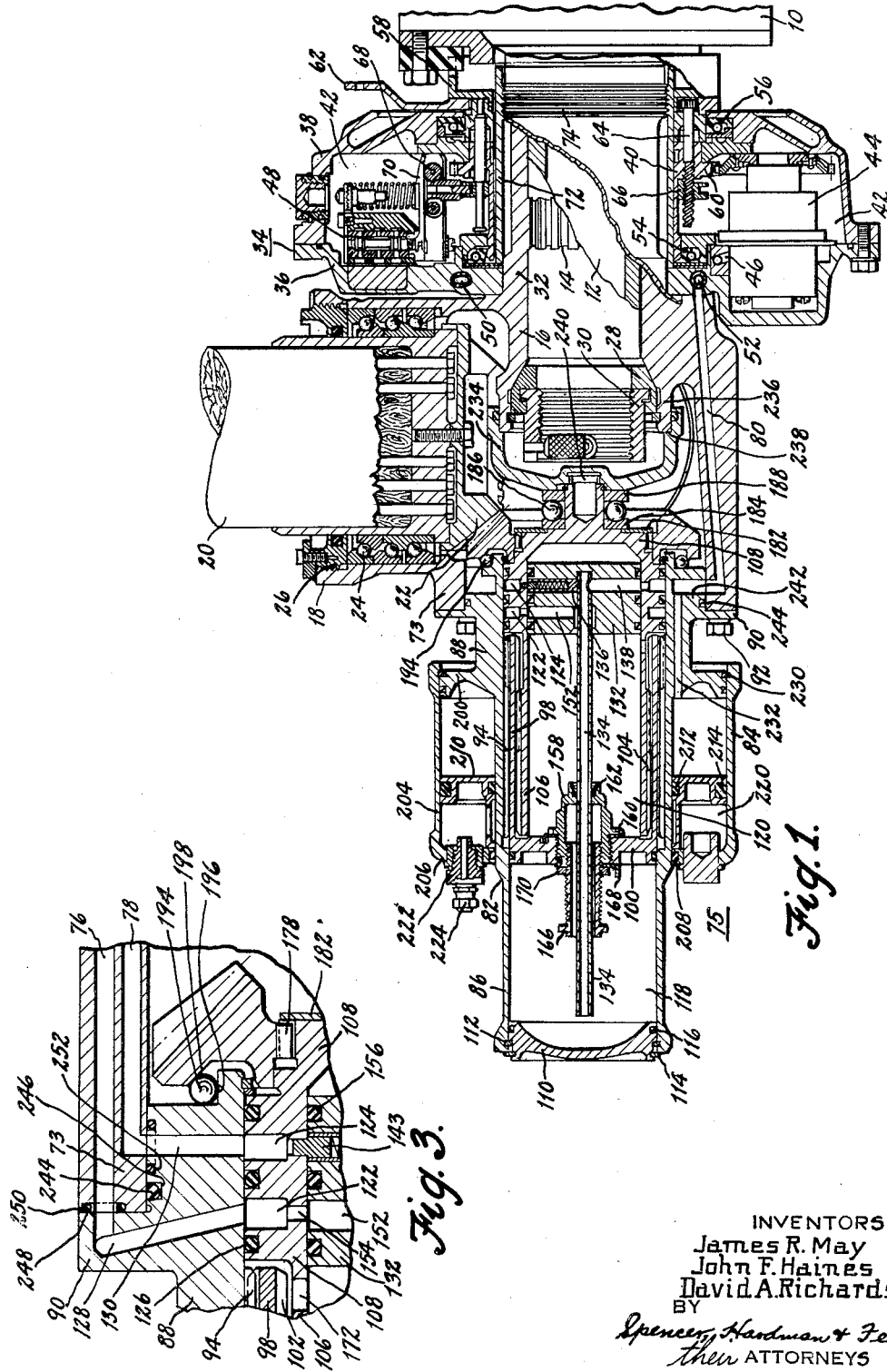
INVENTORS
James R. May
John F. Haines
David A. Richardson
BY
Spencer, Hardman & Fehr
their ATTORNEYS

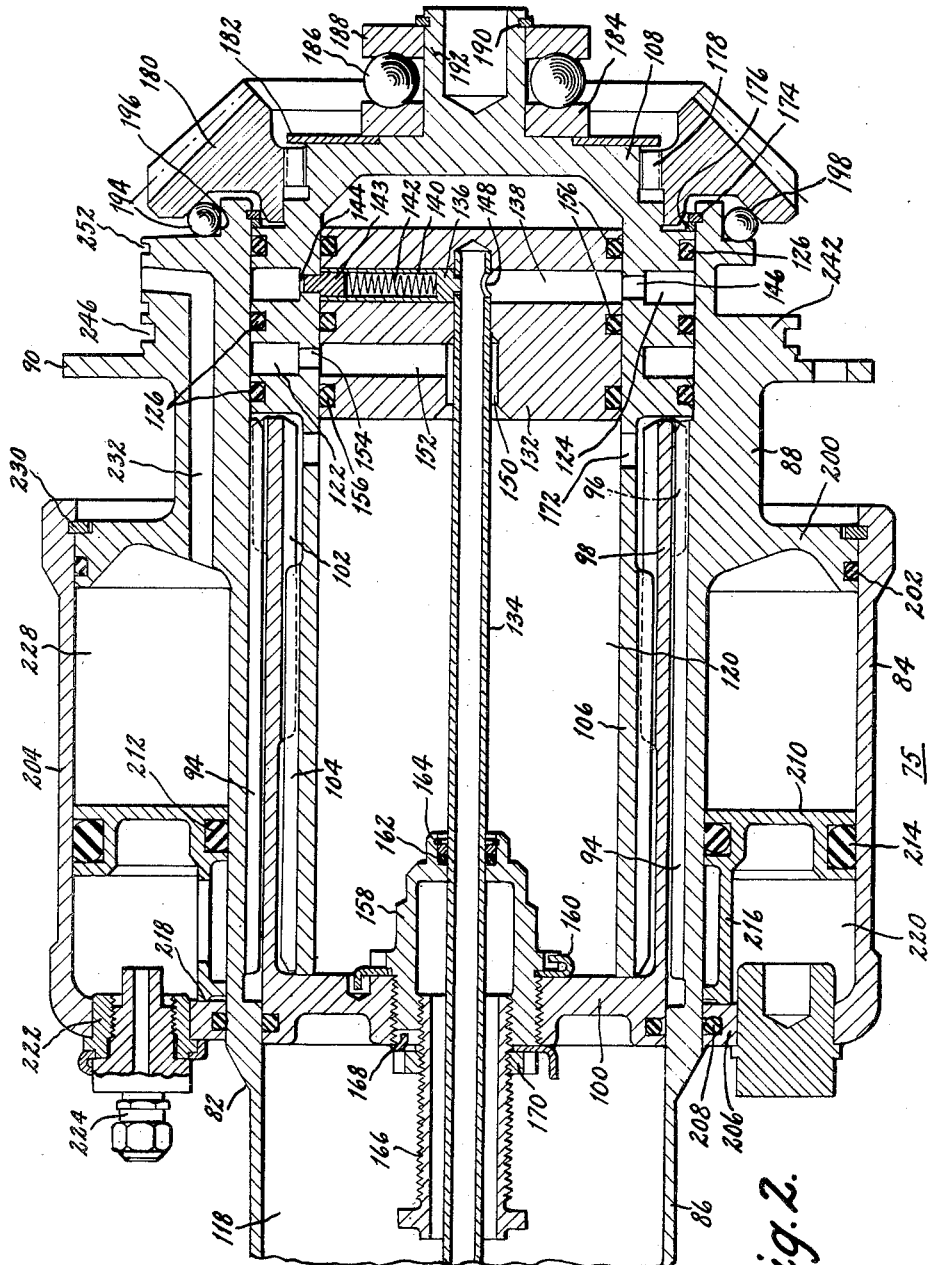

Patented Oct. 24, 1950

2,527,022

UNITED STATES PATENT OFFICE 2,527,022

FLUID CONTROLLED PROPELLER

James R. May, John F. Haines, and David Allen Richardson, Dayton, Ohio, assignors to General Motors Corporation, Detroit, Mich., a corporation of Delaware Application February 17, 1945, Serial No. 578,443

12 Claims. (Cl. 170—160.32)

This invention relates to aircraft propellers and is directed to the improvement of propellers capable of shifting the pitch of the blades for any reason.

One object of the invention is to provide a propeller of the type described with a removable and replaceable power unit with storage chamber, that will be accessible for repair, simple in construction, yet efficient and positive in its operation.

Another object of the invention is to provide a power unit for an aircraft propeller, that embraces a master gear, cylinder, piston, accumulator and transmission means for converting movement of the piston to rotary motion of the gear.

Another object of the invention is to provide an improved axially mounted fluid operated power unit adapted for rapid assembly and removal as a unit of structure for adjusting a plurality of propeller blades.

Yet another object of the invention is to provide an improved torque unit for shifting all of the blades of the propeller in unison, which unit comprises a relatively fixed cylinder, an axially movable piston, and a rotary spline member in driving relation to a master gear with a pressure storage chamber embracing the unit and fitted with fluid connections adapted to lead to fluid circuit channels of the control mechanism.

Further objects and advantages of the present invention will be apparent from the following description, reference being had to the accompanying drawings wherein a preferred embodiment of the present invention is clearly shown.

In the drawings:

Fig. 1 is a longitudinal sectional view through an aircraft propeller fitted with a power unit of the instant invention.

Fig. 2 is an enlarged view in longitudinal section of the power unit by itself, as it is completed for assembly with a conventional shiftable blade propeller.

Fig. 3 is an enlarged view in section showing details of fluid transmission to certain passages of the power unit.

Referring particularly to the drawings, 10 indicates an engine casing or gear casing from which extends a rotatable propeller shaft 12 having splined engagement at 14 with a propeller hub 16 which has a plurality of radially extending sockets 18 for journalling pitch shiftable blades 20. The blades 20 each end in a blade gear or segment 22, and stack bearings 24 within the socket 18 exert thrust against a nut 26 for rotatably retaining the blades in the socket. The hub 16 is retained on the shaft 12 by the usual cone 28 and nut 30. On an aft tubular extension 32 of the hub there is mounted a regulator 34 comprising a plate 36, cover 38, and adapter assembly 40 which closes off the regulator into an annular reservoir 42 that houses a quantity of pressure fluid, and fluid pressure control means for shifting the pitch of the blades. The control means comprises a pump 44 having an intake from the reservoir 42 and emptying into a pressure passage 46 which leads eventually to a governor valve assembly 48 that operates to direct fluid under pressure to either one of two control passages 50. The fluid under pressure from the pump 44 on its way to the governor valve 48 may pass a juncture point where communication is made with a feather control valve for a pressure storage device by a passage 52, somewhat as disclosed in a copending application, 520,627, filed February 1, 1944, in which a valve is operable upon predetermined movement of the governor valve.

The adapter assembly 40 while closing off the inner periphery of the reservoir 42, has a running fit with the plate 36 and cover 38 which is controlled against leakage by fluid seal means 54 and 56, interengaging means such as at 58 being provided on the engine casing or nose 10 for restraining the adapter assembly from turning with respect to the engine nosing and causing it to stand still, while the regulator which is fixed on the propeller hub rotates as a single body. This adapter assembly 40 carries a gear element 60 that effects operation of the pump whenever the propeller is operated, and an oscillatable lever 62 with linkage to the cockpit of the pilot's compartment of the craft operates to selectively rotate screw shaft 64 for adjusting a control ring 66 axially of the reservoir. The control ring operates to shift a fulcrum 68 along a spring pressed lever 70 incorporated in the governor valve 48 that controls the speed level at which the governor valve and regulator will establish equalized control of the propeller blade pitch. The entire regulator including the adapter assembly is retained upon the hub extension 32 by means of a sleeve nut 72 threaded upon the hub extension 32 as at 74. So much in substance is fully described and claimed in the patent to Blanchard and MacNeil 2,307,102, January 5, 1943.

A hydraulic power unit 75, or torque unit as it is sometimes referred to, is mounted on the forward end 73 of the hub 16, and has connection with the regulator thru passages 76, 78 and 80 drilled in an axial direction thru the body of the hub 16. The power unit is a unitary subassembly including a fluid pressure cylinder and piston 82, a pressure storage chamber 84, and mounting means with fluid passages for mounting the unit in advance of the hub and in registry with the hub passages 76, 78 and 80. A master gear is also included that operatively engages all of the blade gears 22 when the power unit is properly mounted. The detail construction of the power unit is shown in Fig. 2, to which reference is now made for detailed description.

The piston and cylinder unit comprises a tubular member or sleeve 86 that has a thickened end portion 88 with an adjacent mounting flange 90 that is apertured to receive screw devices 92 by which the member is secured to the end face of the propeller hub 73. Extending half the length of the bore of the sleeve there are splines 94 arranged in a spiral manner to interengage cooperating splines 96 of the outer surface of a skirt 98 afforded by a piston 100 movable axially of the sleeve 86. The inner surface of the skirt provides similar splines 102 that interengage with splines 104 on the exterior of a tubular spindle 106 extending from a rotatable head assembly 108 journalled within the open end of the cylinder or sleeve 86. The opposite end of the cylinder is closed off by a removable head member 110 that engages against a snap ring 112 seated in the wall of the cylinder, and retained against axial movement by a second snap ring 114 seated in the periphery of the head member and abutting against the end of the cylinder or sleeve 86. A seal ring 116 prevents fluid leakage from the interior of the cylinder. Thus the piston 100 divides the interior of the cylinder into a pair of chambers 118 and 120 having the movable piston as a common separating wall.

The rotatable head assembly 108 closely fits within the end of the cylinder 86 beneath the thickened portion 88, and provides a pair of annular grooves or channels 122 and 124 spaced on each side by shallow grooves filled with seal rings 126 to forestall leakage between the cylinder and the head assembly. Radially directed passages 128 and 130 through the thickened portion 88 of the cylinder connect each of the fluid ways defined by the grooves 122 and 124, with the hub passages 76 and 78. Disposed within the rotatable head there is a transfer body comprising a cylindrical block 132, axially bored to receive a transfer tube 134 anchored in the block by means of a spring pressed plunger 136 disposed within one end of a cross bore 138 of the block 132. The spring pressed plunger includes a barrel 140 housing a spring 142 and a plug 143, the latter being of stepped diameter to project outwardly into a hole or recess 144 opening from the bottom of the groove 124. By that construction, the plunger device operates to lock the body within the rotatable assembly and to restrain the parts against either relative axial, or rotary movement.

When the rotatable head assembly is withdrawn from the cylinder 86 access is then had thru the groove 124 for depression of the plug 143 which allows removal of the body 132 from within the rotatable head assembly.

The annular groove 124 has an additional opening 146 that opens into the other end of the cross bore 138 and thence thru an opening 148 of the tube 134 by which access is had thru the piston head 100 to the cylinder chamber 118. Fluid communication is made with the chamber 120 thru a counterbore 150 in the block 132 surrounding the tube 134 which leads to a radial bore 152 registering with a hole 154 opening into the other annular groove 122. To forestall leakage from one fluid way to another the rotatable assembly 108 is provided with annular grooves fitted with seal rings 156 such that they are slightly compressed when the transfer body 132 is inserted within the spindle 106.

The transfer tube 134 is of sufficient length to extend nearly the length of the cylinder 86, and a slidable engagement is provided by the piston head 100 permitting of near frictionless movement and yet isolating the fluid of chamber 118 from that of chamber 120 and vice versa. Such guide means comprises a cup-member 158 threaded into the piston head 100 where it is rigidly secured by a lock plate 160. The bottom of the cup is counterbored to receive a fluid seal 162 that is retained in place by a snap ring 164, the seal ring 162 stopping fluid flow from the chamber 120 to the interior of the member 158. On the opposite side of the piston head there is a piston stop that comprises a hollow screw 166 surrounding the transfer tube 134 and threading into the cup-like member 158 where it is secured by a lock plate 168 restraining rotation of a clamp nut 170.

Upon the direction of pressure fluid to the chamber 120 the piston 100 is moved to left until the stop 166 may engage the inside of the head 110. On reverse application of pressure, that is to the chamber 118, movement of the piston 100 is effected to the right until the piston engages the end of the spindle 106 which constitutes a stop for movement in the opposite direction. In order to prevent any damped movement of its piston the spindle 106 is apertured at 172 so that the fluid medium from the chamber 120 may always be in communication with the splined provisions 94, 96, 102 and 104, thus sufficiently lubricating them to effect substantially frictionless movement.

The rotatable assembly is retained in the end of the cylinder 86 by means of a snap ring 174 adjacent a shim 176 against which the end of the rotatable assembly abuts. A toothed or non-rounded portion 178 engages the inner periphery of a master gear 180 and affords a sufficient driving connection, the master gear being retained on the rotatable head assembly by an annular plate 182 engaged beneath a bearing ring 184 forming a race for a series of balls 186 cooperating with a second race 188 held in place by a snap ring 190 on an axial hub 192 of the rotatable assembly. These race and ball elements constitute a thrust bearing for the rotatable assembly, and a series of balls 194 rolling in an annular groove 196 of the sleeve 86 engage a surface 198 on the back side of the master gear. The annular plate 182 operates as a spring member to take up lost motion between the oppositely disposed bearings.

In addition to the foregoing provisions the cylinder 86 may provide a flange 200 intermediate its length and of sufficiently greater diameter than the thickened portion 88 to extend radially outwardly thereof. In a peripheral rim of this flange there is an annular groove housing a seal ring 202 which is compressed in a sealing relation by a circular wall 204 of a flanged annulus having an end wall 206 of an inter-diameter sufficient to closely engage the body of the cylinder 86, an annular groove in the periphery of the bottom wall housing a seal ring 208 as heretofore stated. Disposed within the annular chamber thus formed there is an annular piston member 210 whose inner and outer peripheries are grooved to house seal rings 212 and 214 respectively. A cylindrical extension 216 provides a stop 218 engaging against the inside of the bottom wall 206 thus defining an annular chamber 220 which can be reduced to only a predetermined amount in volume. Opening through the bottom wall 206 there is a bushing 222 that supports a check valve assembly 224. The annular piston thus divides the annular chamber into a preloading chamber 220 and a storage chamber 228 when the flanged annulus is mounted on the cylinder and engaged over the flange 200 where it is secured by a snap ring 230. The thickened portion 83 of the cylinder 86 provides a passage 232 that aligns with the hub passage 80 when the power unit is properly assembled and secured upon the hub 16.

To perfect installation of the power unit upon the propeller hub, a cap 234 is disposed over the usual nut 30 to engage about a tubular boss 236 where it firmly seats at 238 and provides a socket or receptacle 240 for receiving the end of the rotatable head assembly of the cylinder, such as to support the race member 188. When so assembled the governor valve 48 with its control passages 50 will have the proper fluid connection with both sides of the piston 100 thru the hub passages 76 and 78, and the pressure storage chamber 228 will have fluid communication with the charging and feathering valve assembly of the regulator thru the fluid ways 232 and hub passage 80. By reason of this fact, when the propeller is rotating, the pump will be caused to operate and deliver its fluid under pressure to the passage 46 which results in fluid under pressure being delivered to the feathering valve assembly. The governor valve assembly operates in a predetermined manner to direct the fluid under pressure to either one or the other of the chambers 118 and 120 as the operating conditions demand, while the feather valve assembly operates to deliver fluid under pressure beyond what is needed by the governor valve assembly, to the pressure storage chamber, and upon being tripped, to connect the stored pressure in the chamber 228 to one or the other of the chambers 118 and 120, as directed by the governor valve assembly 48 after being manipulated from the cockpit by the pilot.

In the preferred embodiment, the attaching end of the power unit providing the thickened portion 88 is telescopically engaged with the end of the hub 73 such that a cylindrical portion 242 aft of the mounting flange 90 fits within the bore of the hub as shown in Fig. 1 where a seal ring 244 lodged in a peripheral groove 246 is compressed to stop any fluid flow past the joint. Details of passage alignment and sealing juncture are shown in the enlarged detail of Fig. 3 where it will be observed that the end of one of the cooperating and aligned passages is counterbored as at 248 for receiving a resilient seal ring 250 which is compressed into sealing relation upon clamping down of the parts by the screw devices 92. On the other hand the sealed juncture may be effected by providing an annular groove 252 around the orifice of the drilled passage and disposing the seal ring therein to be compressed on the clamping engagement of the parts. It should be observed that location of the groove 246 and seal ring 244 about the periphery of the part 242 is such that cross leakage between the drill passages 76 and 78, and consequently between the fluid ways 128 and 130, is prevented.

Should the propeller mechanism need servicing or repair, that can be accomplished without tearing down the whole construction. The power assembly may be removed from the end of the propeller hub and either replaced or repaired without giving any attention to the blade retaining means, and without regard to or disturbance of the regulator adjustment, and without removing the propeller from the drive shaft.

While the embodiment of the present invention as herein disclosed, constitutes a preferred form, it is to be understood that other forms might be adopted, all coming within the scope of the claims which follow.

What is claimed is as follows:

1. In an aircraft propeller having pitch shiftable blades and means for controlling the magnitude and character of the blade shift, the combination comprising, a power driven hub for rotatably supporting the blades, gear elements on the blades for rotating the blades, a master gear for coincidentally actuating all of the gear elements, and a fluid pressure power unit for selectively driving the master gear, said power unit comprising a relatively fixed cylinder and circumscribing pressure storage chamber, a skirted piston having a splined engagement with the interior of the cylinder, a sleeved hub having a splined engagement with the skirted piston and drivingly connected to said master gear, and means for passing fluid pressure to and from the pressure storage means and to and from either side of the piston.

2. In an aircraft propeller having pitch shiftable blades and means for controlling the magnitude and character of the blade shift, the combination comprising, a power driven hub for rotatably supporting the blades, gear elements on the blades for rotating the blades, a master gear for coincidentally actuating all of the gear elements, and a fluid pressure power unit for selectively driving the master gear, said fluid pressure power units comprising a flanged sleeve mounted on the open end of the hub and rotatably supporting the master gear, a spline sleeve journalled within the end of the flanged sleeve and having a portion concentric with the same, means drivingly connecting the splined sleeve and the master gear, a skirted piston within the flanged sleeve and interposed between the flanged sleeve and the splined sleeve, splined provisions connecting the piston with both sleeves whereby axial movement of the piston effects rotary movement of the master gear relative to the flanged sleeve, means for closing the end of the flanged sleeve, and means extending through the flanged sleeve and the splined sleeve for admitting fluid under pressure to either side of the piston.

3. In an aircraft propeller having pitch shiftable blades and means for controlling the magnitude and character of the blade shift, the combination comprising, a power driven hub for rotatably supporting the blades, gear elements on the blades for rotating the blades, a master gear for coincidentally actuating all of the gear elements, and a fluid pressure power unit for selectively driving the master gear, said power unit comprising a tubular member having a thickened portion secured to the front end of the hub to rotate therewith, an annular flange circumscribing the member in advance of the hub, a cylindrical shell closely embracing the member and the flange to provide a fluid storage chamber, an annular piston extending across the chamber and adapted to move lengthwise thereof, means for charging one side of the annular piston with air under pressure, means including passages through the thickened portion of the tubular member for flow of fluid to and from the chamber on the other side of the annular piston, and double acting expansion chamber means within the tubular member for actuating said master gear.

4. In an aircraft propeller having pitch shiftable blades and means for controlling the magnitude and character of the blade shift, the combination comprising, a power driven hub for rotatably supporting the blades, gear elements on the blades for rotating the blades, a master gear for coincidentally actuating all of the gear elements, and a fluid pressure power unit for selectively driving the master gear, said power unit comprising a cylindrical member extending axially forward of the hub, a variable capacity accumulator surrounding the cylinder, head means closing both ends of the cylinder, one of said head means being rotatable within the cylinder and drivingly supporting the master gear and providing an inwardly spaced concentric sleeve, a piston within the cylinder movable between the other head and the said sleeve, said piston providing a skirt interposed between the cylinder and sleeve and splined to each whereby movement of the piston effects rotary motion of the master gear, and a thrust bearing disposed between the power unit and the hub.

5. In a propeller having hydraulically controlled pitch shiftable blades, the combination comprising, a fluid pressure power unit adapted for fixed flange mounting on the propeller and for registry with fluid passages provided thereby, said unit including, a sleeve having an internal splined portion and an exterior annular flange intermediate its length, a movable head member within the sleeve having an exteriorly splined tubular extension concentric with the sleeve, a piston movable along the sleeve and having a skirt interposed between the sleeve and tubular extension and cooperatively splined with each, said splined provisions being such that piston movement within the sleeve effects rotative movement of the movable head, and means for transferring fluid through the sleeve and tubular extension to and from either side of the piston.

6. In a propeller having hydraulically controlled pitch shiftable blades, the combination comprising, a fluid pressure power unit adapted for flange mounting on the propeller and for registry with fluid passages provided thereby, said unit including, a sleeve having an internal splined portion and an exterior annular flange intermediate its length, a flanged ring of stepped diameter fitting about the sleeve and flange to close off an annular chamber, an annular piston within the chamber and means for yieldingly urging the piston toward the flange, a tubular member concentric with the sleeve and having a closed end adapted to close one end of the sleeve and rotate therein, a head member closing the other end of the sleeve, a piston movable axially of the sleeve and operatively connected with the sleeve and tubular member to effect rotative movement of the tubular member upon such axial movement, and passage means extending through the sleeve communicating with the annular chamber and with both sides of the piston within the sleeve.

7. A hydraulic torque unit, comprising in combination, a relatively fixed cylinder having a thickened body at one end, means providing a pressure storage chamber adjacent the thickened end, fluid passage means opening to the storage chamber, head means for closing the ends of the cylinder, one of which head means is rotatable relative to the cylinder, a piston within the cylinder and means for orientating its movement axially of the cylinder, an axial extension on the rotatable head having a cammed connection with the piston whereby movement of the piston within the cylinder effects rotary movement of the said head assembly, and passage means extending through the thickened body of the cylinder and the rotatable head assembly for communicating with both sides of the piston.

8. The combination set forth in claim 7, wherein the rotatable head assembly provides annular grooves with their open side exposed to the inner surface of said cylinder, a transfer body secured within the rotatable head having fluid ways communicating with each side of the piston, and openings through the rotatable assembly connecting the annular grooves each with a fluid way of the transfer body, said cylinder having passages through the thickened body connecting with the annular grooves.

9. A hydraulic torque unit, comprising in combination, a relatively fixed cylinder having a thickened body at one end, head means closing off each end of the cylinder and one of which constitutes a rotatable assembly, a sleeved extension of the rotatable assembly projecting into the cylinder in radially spaced relation, a piston in the cylinder having a skirt with interengaging relations with the cylinder and rotatable assembly whereby movement of the piston within the cylinder effects rotation of the said head assembly with respect to the cylinder, a transfer assembly rotatable with the head assembly and including a transfer tube extending in slidable engagement through the piston, and fluid ways extending through the thickened wall of the cylinder to connect with each side of the piston.

10. In an aircraft having a rotatable propeller shaft extending from a gear casing, the combination comprising, a self contained hydraulically operated pitch shiftable propeller drivingly related to said shaft and controllable from said gear casing, said propeller comprising a unitary assembly including a hub secured to the shaft, a fluid pressure regulator disposed between the gear casing and propeller hub for rotation therewith and adapted to develop and direct a fluid medium under pressure, a hydraulic power unit removably secured to the foreward end of the hub and providing a master gear for effecting pitch shift, a pressure storing chamber surrounding the power unit, and fluid passages extending through the hub for hydraulically connecting the power unit with the regulator and with the said chamber.

11. In an aircraft propeller having a hub and pitch shiftable blades mounted on a drive shaft, the combination of a regulator mounted on the hub and providing fluid pressure actuated means mounted for rotation with the hub and adapted to shift the blades in pitch to best suit the demands in aircraft maneuvering, by developing and directing a fluid pressure source, a fluid pressure power unit removably mounted on and in advance of the hub for rotation therewith, said power unit comprising a cylinder flange-mounted to the hub, a splined sleeve inwardly concentric of the cylinder and having a journalled part driving a master gear for shifting the blades, a piston within the cylinder having a skirt splined to the cylinder and to the sleeve and adapted upon movement axially of the cylinder to effect rotary movement of the sleeve relative to the cylinder, means operatively connecting the power unit with the blades for coincidental shifting thereof, and fluid passages connecting the regulator with the power unit whereby the power unit will respond to the directed fluid pressure from the regulator.

12. In an aircraft propeller having a hub and pitch shiftable blades mounted on a drive shaft, the combination of a regulator on the hub providing fluid pressure means adapted to shift the blades in pitch to best suit the demands for propeller operation, means for developing fluid pressure upon rotation of the regulator, a fluid pressure power unit removably mounted on the hub for rotation therewith, means operatively connecting the power unit with the blades for coincidental shifting thereof including a splined sleeve having a closed end fitting for rotation within a cylinder, a master gear carried by and driven by the closed end, and thrust bearings limiting axial movement of the master gear, and fluid passages in the hub connecting the regulator with the power unit whereby the power unit will respond to directed fluid pressure from the regulator.

JAMES R. MAY.
JOHN F. HAINES.
DAVID ALLEN RICHARDSON.

REFERENCES CITED

The following references are of record in the file of this patent:

UNITED STATES PATENTS

| Number | Name | Date |
|---|---|---|
| 2,147,078 | Barish | Feb. 14, 1939 |
| 2,174,717 | Caldwell et al. | Oct. 3, 1939 |
| 2,229,058 | Dicks | Jan. 21, 1941 |
| 2,307,101 | Blanchard | Jan. 5, 1943 |
| 2,307,102 | Blanchard | Jan. 5, 1943 |
| 2,361,954 | Martin | Nov. 7, 1944 |
| 2,371,873 | Martin | Mar. 20, 1945 |
| 2,373,335 | Davie | Apr. 10, 1945 |
| 2,391,699 | Haines et al. | Dec. 25, 1945 |
| 2,403,532 | Hoover | July 9, 1946 |

FOREIGN PATENTS

| Number | Country | Date |
|---|---|---|
| 119,164 | Australia | Nov. 23, 1944 |
| 734,586 | France | Aug. 2, 1932 |
| 789,794 | France | Nov. 6, 1935 |